US007231365B2

(12) United States Patent
Kashima et al.

(10) Patent No.: US 7,231,365 B2
(45) Date of Patent: Jun. 12, 2007

(54) AUCTION METHOD AND AUCTION SYSTEM, AND STORAGE MEDIUM THEREFOR

(75) Inventors: Hisashi Kashima, Yamato (JP); Yasumasa Kajinaga, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 10/003,684

(22) Filed: Nov. 15, 2001

(65) Prior Publication Data

US 2002/0152182 A1 Oct. 17, 2002

(30) Foreign Application Priority Data

Nov. 14, 2000 (JP) .............................. 2000-347349

(51) Int. Cl.
*G06Q 40/00* (2006.01)
(52) U.S. Cl. .......................................... 705/37; 705/35
(58) Field of Classification Search ............. 705/35–37
See application file for complete search history.

(56) References Cited

U.S. PATENT DOCUMENTS

| 6,272,473 B1* | 8/2001 | Sandholm ..................... 705/37 |
| 7,062,460 B1* | 6/2006 | Growney et al. ............. 705/37 |
| 2002/0042769 A1* | 4/2002 | Gujral et al. ................... 705/37 |
| 2003/0004850 A1* | 1/2003 | Li et al. ......................... 705/37 |
| 2003/0018560 A1* | 1/2003 | Dietrich ......................... 705/37 |
| 2003/0033236 A1* | 2/2003 | Davenport et al. ........... 705/37 |
| 2003/0233315 A1* | 12/2003 | Byde et al. .................... 705/37 |
| 2005/0137959 A1* | 6/2005 | Yan et al. ...................... 705/37 |

FOREIGN PATENT DOCUMENTS

| JP | 2004062387 A | * | 2/2004 |
| JP | 2005122660 A | * | 5/2005 |
| JP | 2006172515 A | * | 6/2006 |

OTHER PUBLICATIONS

Yokoo, Makoto "Secure Multi-Agent Dynamic Programming based Homomorphic Encryption and its Application to Combinatorial Auctions" CiteSeer, 2002.*
Hattori et al. "A Dynamic Programming Model for determining Bidding Strategies in Sequential Auctions: Qasi-Linear Utility andBudget Constraints" from website: www.kecl.ntt.co.jp/csl/ccrg/members , Unknown date.*
Byde, Andrew "An optimal Dynamic Programming Model for Algorithm Design in Simultaneous Auctions" Hewlett Packard Company, HPL-2001-67, Mar. 30, 2001.*

* cited by examiner

*Primary Examiner*—Narayanswamy Subramanian
(74) *Attorney, Agent, or Firm*—Whitham, Curtis Christofferson & Cook, PC; Stephen C. Kaufman (57) ABSTRACT

A solution is provided for the problem of determining a successful bidder in an auction wherein bids are submitted for a great number of trading targets (products). Two restrictions are imposed on the combinations of products that are permitted: 1. Bids may be submitted for only one product type; and 2. The relationship existing among available combinations of products for which bids may be submitted must be based on a hierarchical structure. From a set of bids submitted under the above restrictions, a subset of optimum bids are selected by using dynamic programming.

5 Claims, 8 Drawing Sheets

AUCTION METHOD AND AUCTION SYSTEM, AND STORAGE MEDIUM THEREFOR

BACKGROUND OF THE INVENTION

1. Field of the Invention

The present invention relates to a method and a system for determining a successful bidder in an auction for products offered for sale and for which buyers submit bids, such as auction or competitive bids, that each include a product and a desired volume and an evaluation price. In particular, the present invention pertains to a technique for employing a practical number of calculations to make a determination that generally, when large volumes of product sets of multiple types are bid on, requires a huge number of calculations.

2. Related Art

Spurred by the development and generalization of Internet techniques that serve as background, electronic commerce and electronic auctions have relatively recently become popular.

For such an auction, a process is performed during which collected bids are sorted through to determine which bidder or bidders have submitted successful bids for the purchase of goods. Generally, the determinations involved are based on the selection of a bid or bids that provide a seller the maximum profit.

When a product targeted for trade is the only one of its type, the successful bidder is the buyer whose bid represents a cost evaluation higher than all others. For example, if a single jar is put up for auction, the buyer who offers the highest price for the jar will be the successful bidder.

For an auction or for bidding performed for business to business transactions, products tend to be offered and purchased in bulk. For example, assume a transaction wherein a vendor having multiple computers in stock accepts, from multiple buyers, bids of "600,000 yen for five computer units (120,000 yen per unit)". In this case, a set of bids is selected wherein the total evaluation price (the price obtained by multiplying the evaluation price for one unit by the number of units) for the individual bids is the maximum.

It should be noted, however, that a condition must be satisfied whereof the volume of the goods involved in the transaction (the total number of units covered by the selected bids) will not exceed the volume available for the transaction (the stock count). That is, the set of bids that provide the maximum gain with the least dead stock is selected, and the companies who submitted these bids are the successful bidders. This problem is equivalent to a well known knapsack problem, and the optimum solution can be obtained by dynamic programming.

As is well known, dynamic programming is an optimum programming method that when used to solve N one-dimensional problems provides for an N-dimensional multistage decision problem to be replaced by a functional recursive equation, based on the principle of optimality. The above problem is represented as an established form according to which, for example, a subset $\{b_k\}$ is calculated that maximizes $\Sigma r_k e_k$ under a condition wherein $\Sigma r_k \leq s$, when n (=|B|) bids (in the above example, the purchase orders for computers) are provided as a set $B=\{b_1, b_2, \ldots, b_k, \ldots, b_n\}$. It should be noted that $r_k$ denotes the number of products ordered in bid $b_k$, $e_k$ denotes the evaluation price for one product in bid $b_k$, s denotes the count of the products in stock, and $r_k$ denotes a non-negative integer.

The algorithm used for this problem is as follows. First, the evaluation value array V(k,j) is defined in the (n+1)×(s+1) space, with k denoting an integer of $1 \leq k \leq n+1$, and j, an integer of $0 \leq j \leq s$.

As the initial step, the following equations are calculated.

$V(|B|+i,j):=0$ for all $0 \leq j \leq s$ $V(k,s):=V(|B|+1,s)$ for all $1 \leq k \leq |B|$     [Equation 11]

Further, the following recursive equation is defined.

$V(k,j):=\max\{V(k+1,j),V(k,j+1),V(k+1,j+r_k)+r_k e_k\}$     [Equation 12]

It should be noted that max{a,b,c} is a function for providing the maximum value selected from among those represented by a, b and c.

Then, the recursive equation is calculated, in the descending order, for k from |B| to 1 and for j from s−1 to 0. When $j+r_k$ exceeds s, the value of $V(k+1,j+r_k)+r_k e_k$ is not selected.

When the calculations for the recursive equation are continued until k=1 and j=0, the value substituted into V(1,0) indicates the maximum gain. Then, when the back tracking is performed along the route by which V(k, j) is reached from the maximum value (=V(1,0)) to 0 (=V(|B|+1, s)), the selected bit $b_k$ can be identified.

That is, when there is only one type of product, a bid designating more than one unit and evaluation price can be optimally selected (determined) using dynamic programming. In the above process, the number of required calculations is O (|B|)

When each bid submitted must be limited to a single type of product, even when multiple types of products are offered for sale, if no restriction is imposed on the submission of bids for different product types, substantially, this is the same as when an auction is separately performed for each product type. Thus, the bids are sorted for each product, and the above method can be used for each product to determine a successful bidder.

SUMMARY OF THE INVENTION

In many cases, multiple types of products are handled for transactions engaged in by companies, and generally, multiple types of products are traded. That is, not only does trading involve individual product types, but also it provides for requests for a combination of products. For example, a request may be issued for the purchase of "a set of a personal computer, a display device and a printer for 200,000 yen". For products normally used in sets, it is desirable that the same number of each product in a set be purchased, and it is preferable that the combination of products be as arbitrary as possible. For an auction held for companies, it is predicted that the number of products in stock and the number of units included in bids that are submitted will be enormous. Thus, for trading between companies, it is by all means necessary that a bid having the form "200 to 300 sets of personal computers and display devices, 150,000 yen for each set" be permitted for targeted sales of 500 units of personal computers, 400 units of display devices, 300 units of printers, 200 sets of paper and 400 units of desks.

However, for a bid for which a combination of products is permitted, the allocation of products (i.e., the combination of bids) wherein the sum of evaluation prices is the maximum must be determined. This problem is an NP-hard problem when a bid is permitted for an arbitrary combination of multiple types of products. That is, no polynomial time algorithm is available. And when there are multiple types of products and multiple units of each type are provided (a case of "five units of personal computers, four units of display devices and three units of printers"), the same NP-hard problem is encountered. That is, in general, it is impossible to solve this problem within polynomial time.

When an extremely small number of products is provided for a combination, an optimum solution can be arrived at for this combination; however, as the number of products increases, it becomes impossible to solve this problem using the calculation speeds that are currently available.

It is, therefore, one object of the invention to provide a solution for the problem involved in determining a successful bidder in an auction wherein bids are submitted for a great number of trading targets (products).

It is another object of the invention to provide an auction method and an auction system that require only a practical number of calculations for their execution, and that permit bids to be submitted for a combination of products.

It is an additional object of the invention to provide an auction method and an auction system that require only a practical number of calculations for their execution, and that permit a bid having a range for a desired volume of products.

It is a further object of the invention to provide an auction method and an auction system that require only a practical number of calculations for their execution, and that can change an evaluation price in accordance with the product volume.

An overview of the present invention will be provided as follows. As previously described, the problem can not be solved when a bid is permitted for an arbitrary combination of products. Therefore, according to the auction method and the auction system of the invention, the following two restrictions are imposed on the combinations of products that are permitted:

1. Bids may be submitted for only one product type.
2. The relationship existing among combinations of products for which bids may be submitted must be based on the hierarchical structure shown in FIG. 8.

From a set of bids submitted under the above restrictions, a subset of optimum bids may be selected by using dynamic programming, and for the auction, the parties that tendered the selected bids are the successful bidders. In this invention, since the above restrictions are imposed, the NP-hard problem can be avoided and an optimum solution can be obtained by performing a practical number of calculations. Since even though the restrictions are imposed bidding on a combination of products is permitted, auctions may be held for the sale by companies of products to companies. The present invention can be enumerated as follows.

1. According to the invention, an auction method for holding an auction for a product comprises the steps of: receiving bids, for each product type in a transaction, that include minimum desired volumes and maximum desired volumes and evaluation prices for the product; generating a finite set of bids that include as an element the bids that were received; and employing dynamic programming to generate, using the bid set, a subset of bids wherein the maximum gain is obtained within a range represented by the count of the product available for sale.

The evaluation prices for the product can be represented as a non-linear function relative to the desired volume of the product type in the transaction.

The auction method further comprises the steps of: allocating a two-dimensional array V to a memory area by using the dynamic programming; initializing the two-dimensional array V; and recursively solving the recursive equation for the two-dimensional array V, wherein $$V(k,j) := \max\{V(k+1,j), V(k, j+1) \max_{l_k \leq x \leq h_k}\{V(k+1,j+x)+e_k(x)\}\}$$ [Equation 13]

is used as the recursive equation, where k denotes an integer equal to or greater than 1 and equal to or smaller than n; j denotes an integer equal to or greater than 0 and equal to or smaller than s; n denotes the number of bids; s denotes the number of products available for the transaction; $e_k$ denotes the evaluation price when x units of products are purchased according to the bid $b_k$; $l_k$ denotes the minimum volume of the bid $b_k$; and $h_k$ denotes the maximum volume of the bid $b_k$.

The auction method further comprises the steps of: allocating two-dimensional arrays V and Q to a memory area by using the dynamic programming; initializing the two-dimensional arrays V and Q; and recursively solving recursive equations for the two-dimensional arrays V and Q, wherein the evaluation prices for the product represent a linear function relative to the volumes for the product desired for the transaction, wherein $$V(k, j) := \max\begin{cases} V(k+1, j) \\ V(k, j+1) \\ V(k, j+1) + e_k \\ V(k+1, j+l_k) + e_k l_k \end{cases} \quad (\text{if } l_k \leq Q(k, j+1) < h_k)$$ [Equation 14]

$$Q(k, j) := \begin{cases} Q(k, j+1) + 1 & (\text{if } V(k, j) = V(k, j+1) + e_k) \\ l_k & (\text{if } V(k, j) = V(k+1, j+l_k) + e_k l_k) \\ Q(k, j+1) & (\text{if } V(k, j) = V(k, j+1)) \\ 0 & (\text{otherwise}) \end{cases}$$

is employed as the recursive equation, wherein k denotes an integer equal to or greater than 1 and equal to or smaller than n; j denotes an integer equal to or greater than 0 and equal to or smaller than s; n denotes the number of bids; s denotes the number of products available for the transaction; $e_k$ denotes the evaluation price in the bid $b_k$ for a product for each unit; $l_k$ denotes the minimum volume of the bid $b_k$; and $h_k$ denotes the maximum volume of the bid $b_k$.

A bid according to which the product is optimally distributed can be selected by back tracking of the two-dimensional array V from the element on the smallest row and in the smallest column.

2. According to the invention, an auction method for performing an auction for multiple products of multiple types comprises the steps of: receiving bids that each include a combination of the products (including only one type of one product), the volume of the combination desired for the transaction and an evaluation price for the combination;

generating a finite set of bids that include the bids as elements; and employing dynamic programming to generate, using the bid set, a subset of bids wherein a maximum gain is obtained within a range represented by the count of the individual products that are available for sale, wherein the combination of the products satisfies either a first condition $C_i \cap C_j \neq \phi$ or a second condition $C_i \subset C_j$, wherein $C_i$ and $C_j$ (i<j) are two different arbitrary combinations.

The minimum volume and the maximum volume for the combination desired for the transaction can be designated as the volumes for the combination.

The evaluation prices for the combination can be represented as a non-linear function relative to the volume of the combination desired for the transaction.

The auction method further comprises: a step of sorting the bids in accordance with each combination type by using the dynamic programming method; a step of allocating a two-dimensional array V for the sorted combination $C_i$; an initialization step, which includes the steps of determining whether a child set of the combination $C_i$ is an empty set and substituting, when the determination is true, 0 into each element on the (n+1)th row of the two-dimensional array V; and substituting, when the determination is false, the sum of the elements on the first row of the two-dimensional array V, for all the child sets of the combination $C_i$, into all the elements on the (n+1)th row of the two-dimensional array V; and a step of recursively solving the recursive equation of the two-dimensional array V.

Further, as the recursive equation either $$V(k,j):=\max\{V(k+1,j), V(k,j+1), V(k+1,j+r_k)+r_k e_k\} \quad \text{[Equation 15]}$$

is employed, wherein k denotes an integer equal to or greater than 1 and equal to or smaller than n; j denotes an integer equal to or greater than 0 and equal to or smaller than s; n denotes the number of bids for the combination $C_i$; s denotes the minimum number of products available for the transaction, which is included in the combination $C_i$; $e_k$ denotes the evaluation price in the bid $b_k$ for one combination; and $r_k$ denotes the volumes of the combinations for the bid $b_k$; or a recursive equation is employed that is the same as either equation 13 or equation 14.

For a set $C^R$ that is a subset of the whole set C and has the combination $C_l$ as one element, but whose other elements are not child sets of the other elements of the set C, the two-dimensional array V is tracked backward, beginning with the element on the minimum row and in the minimum column, and after the element on the (n+1)th row is reached, from the first row of a child set of the element on the (n+1)th row, the two-dimensional array is tracked further backward to select a bid for the optimal distribution of the products.

In addition to the auction method, the present invention includes a system for implementing the auction method, and a storage medium on which a program is stored that permits a computer to carry out the functions of the auction method.

DESCRIPTION OF THE PREFERRED EMBODIMENTS

The preferred embodiments of the present invention will now be described in detail while referring to the accompanying drawings. It should be noted, however, that the present invention can be implemented by various other modes, and is not limited to these embodiments. The same reference numerals are used throughout the embodiments to denote corresponding components.

In the following embodiments, mainly, a method or a system will be described; however, as will be apparent to one having ordinary skill in the art, the invention can be carried out not only as a system, but also as a storage medium on which computer-readable program code is stored. Therefore, the present invention can be provided as hardware, software, or as a combination of hardware and software. An example storage medium on which the program code can be stored is an arbitrary computer-readable medium, such as a hard disk, a CD-ROM, an optical storage device or a magnetic storage device.

A computer system used for the embodiments of the invention comprises a central processing unit (CPU), a main memory (RAM: Random Access Memory) and nonvolatile memory (ROM: Read Only Memory), all of which are interconnected by a bus.

In addition, a co-processor, an image accelerator, a cache memory and an input/output controller (I/O) are connected to the bus, and an external storage device, a data input device, a display device and a communication controller may be connected to the bus via an appropriate interface. Further, this computer system can also include hardware resources with which a computer system is generally equipped. An example external storage device can be a hard disk drive; however, the external storage device is not thereby limited, and may include a magneto-optical storage device, an optical storage device, or a semiconductor storage device, such as flash memory. When the external storage device is used only for reading data or a program, a read only storage device, such as a CD-ROM, that can be used only for data reading is also included as an external storage device. The data input device can be include a keyboard, or a pointing device such as a mouse. A speech input device can also be employed as a data input device. An example display device can be a CRT, a liquid crystal display device or a plasma display device. Furthermore, the computer system can comprise an arbitrary computer, such as a personal computer, a workstation or a mainframe.

In the following embodiments, a computer system using a computer network, especially the Internet, is employed to implement the auction system of the invention. However, the invention is not limited to a computer network that uses the Internet, and a computer network may be employed that is constituted by a LAN, a WAN or a private line, or another computer network. Or, the present invention can be applied for a single computer system.

When the invention is implemented by multiple computer systems, the program used by each computer system may be recorded in another computer system, e.g., a server computer or a database server. That is, one part of the program used by a computer system can be distributed and processed by a remote computer, e.g., a server or a client computer. When an address is used to refer to a program stored in a different computer system, a DNS, a URL or an IP address can be employed.

Here it should be noted that a reference to the Internet also refers to intranets and extranets, that the accessing of the Internet also refers to accessing intranets or extranets, and that the term "computer network" includes both computer networks that permit public access and computer networks that permit only private access.

First Embodiment

Figure 1:
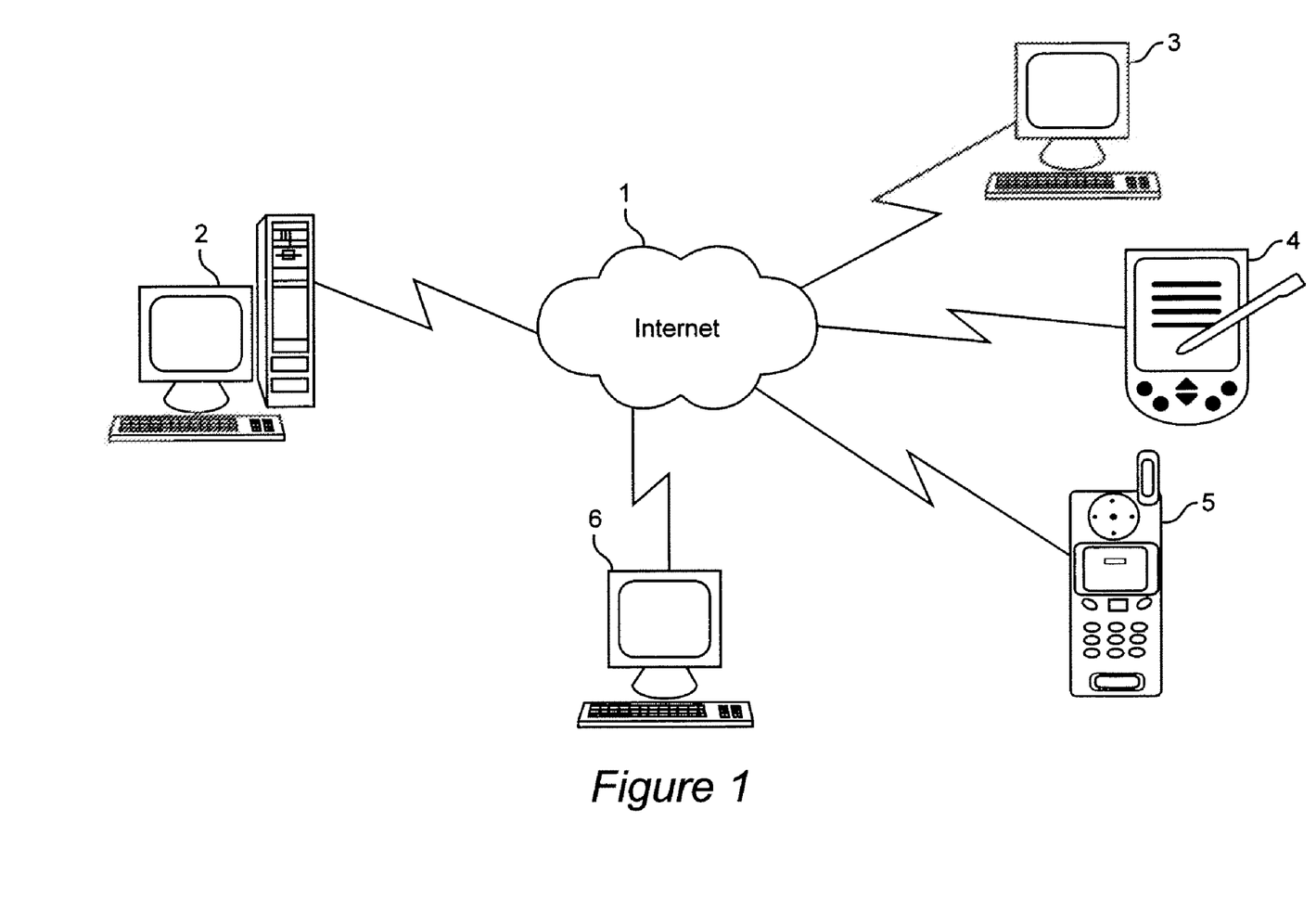
FIG. 1 is a diagram showing an overview of an example auction system according to one embodiment of the invention.

FIG. 1 is a diagram showing an overview of an example auction system according to a first embodiment of the invention. The auction system in this embodiment comprises the Internet 1, to which a server system 2, which provides an auction site, and a computer system 3 of a user, who submits tenders for goods sold by auction, are connected. A user who participates in an auction can not only use a computer system 3, but can also use a PDA (Personal Digital Assistant) 4 or a portable telephone 5 that can access the Internet 1. And a vendor may not only personally offer targeted products for sale by auction by utilizing the site provided by the server system 2, but may also, as consignor, ship goods on consignment for sale by the server system 2, as consignee. In this case, the vendor can use a computer system 6 to forward to the server system 2, via the Internet 1, a request that an auction be held.

As is well known, the Internet 1 is a computer network that employs TCP/IP (Transmission Control Protocol/Internet Protocol) or UDP (User Datagram Protocol) to connect hosts. The computer system 3, the PDA 4 and the portable telephone 5 of a user, and the computer system 6 of a vendor have a function of issuing HTTP (Hypertext Transfer Protocol) requests and a function of displaying documentary responses written in HTML (Hypertext Markup Language) or XML (extensible Markup Language). In addition to the computer systems 3 and 6, the PDA 4 and the portable telephone 5, other information processing apparatuses can be employed so long as they can perform these functions.

Figure 2:
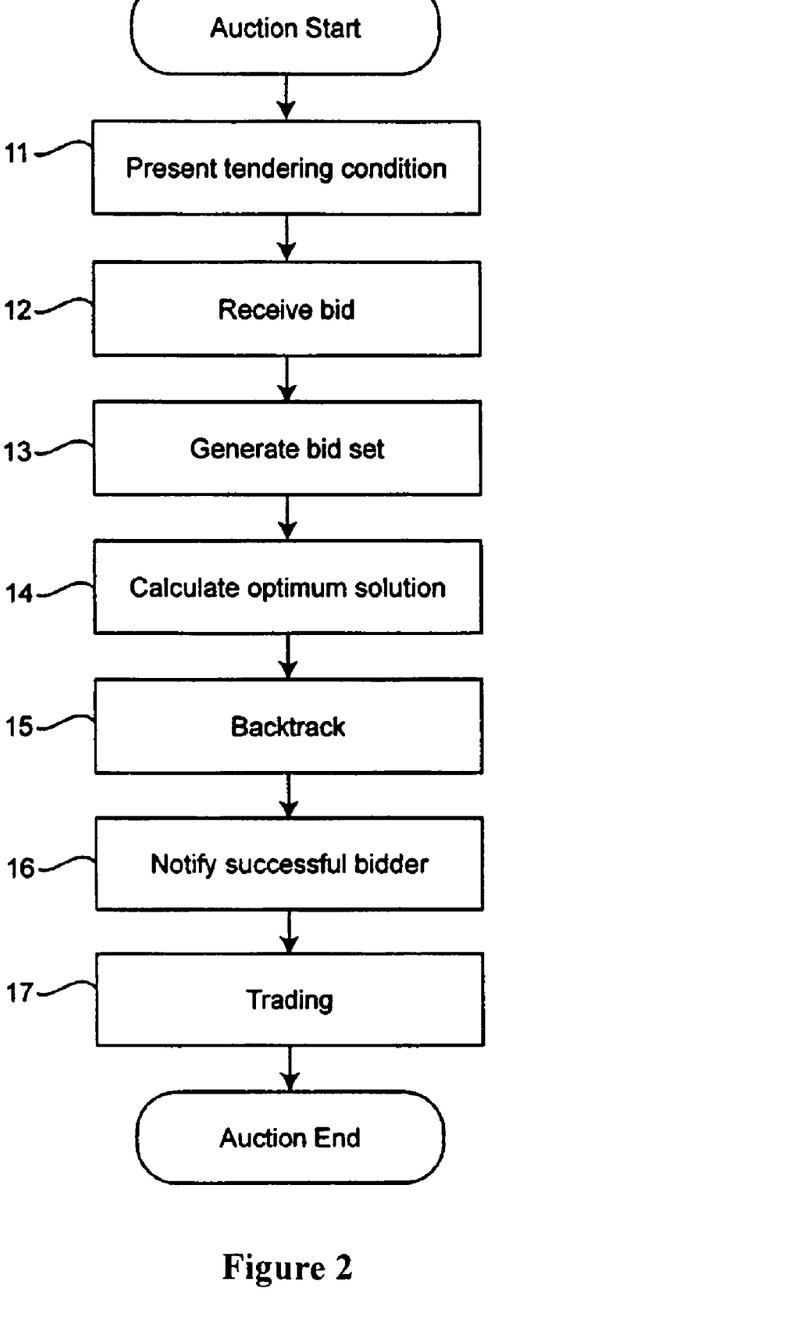
FIG. 2 is a flowchart presenting an overview of the processing for an example auction method according to the embodiment.

FIG. 2 is a flowchart showing an overview of an example auction method for this embodiment.

First, the server computer 2, in the process of providing an auction site, announces tender conditions for the auction (step 11). Such tender conditions are, for example, the name of a product targeted for sale and the number of items offered (the stock volume available for supply), a set of products for which bids will be accepted when multiple product types are offered, and a tendering period. A consignee of a product vendor presents the tendering conditions in accordance with instructions received from the computer system 6 of the product vendor. It should be noted that in this embodiment, bids will be accepted only for one product type, regardless of whether one product type or multiple product types are being handled. Therefore, in this embodiment only one type of product can be bid on. When bidding is permitted for only one product type in an auction handling multiple product types, this is the equivalent of a separate auction being held for each, individual product type. An example wherein bidding is permitted for multiple product types will be described later.

Bids accepted from auction participants are submitted by means of computer systems 3, PDAs 4 and portable telephones 5 (step 12). In this embodiment, a bid submitted for the purchase of a product can include desired maximum and minimum volumes. For example, to submit a request to the effect, "want at least 800 units, although actually desire 1000 units", a bid can be submitted for a maximum volume of 1000 and a minimum volume of 800. This is an extremely normal bid submitted, for example, furnishing the material. Further, in a bid for this embodiment, an evaluation price for one unit of the product can be changed in accordance with the number of units to be purchased. For example, a bid of "150,000 yen for three units, 230,000 yen for four units and 300,000 yen for five units" can be offered. Discount requests are frequently submitted for the large volume purchases, and a bid that permits such a business custom can be implemented.

A bid that matches the tender conditions can be accepted, while if a bid is submitted that does not match them, a message to the tenderer can be forwarded in reply thereof stating that the bid was not acceptable.

When the tendering period has expired, the acceptance of bids is closed, and a set of bids, $B=\{b_1, b_2, \ldots, b_n\}$, submitted during the tendering period is generated (step 13). The bid element $b_k$ ($k=1, 2, \ldots, n$) includes the evaluation prices $e_k$ ($k=1, 2, \ldots, n$) for the product and the desired minimum units $l_k$ and maximum units $h_k$ ($k=1, 2, \ldots, n$). The size of the bid set B is $|B|=s$.

In this embodiment, the evaluation price for a single product unit is not fixed, and can vary in accordance with the purchase volume. Thus, the product evaluation price $e_k$ is a function $e_k(x)$ of the number x of products to be purchased.

The bid set B is generated for each product type. That is, when only one type of product is handled for an auction, bids for that product are accepted, and when multiple types of products are handled, bids are accepted for each product type.

An optimum solution is calculated whereby the maximum gain is derived from a generated bid set (step 14), and dynamic programming is employed for the calculation of an optimum solution. The method for calculating an optimum solution will be described later in detail.

Backtracking is performed for a thus obtained optimum solution to select bids whereby the maximum gain is afforded (step 15). These selected bids constitute a subset of the bid set B, and persons who submitted the selected bids are deemed the successful bidders in the auctions. The backtracking process will be described in detail later.

The successful bidders are then notified that their bids were selected (step 16), and procedures are initiated to transfer the products to those buyers (step 17). It should be noted that bids from either one or multiple winners may be selected. Further, although a successful bidder may not refuse to participate in the final stages of a transaction, an option permitting the cancellation of a bid may be provided under a contract entered into with the product vendor.

The auction is thereafter terminated. Note, however, that the above processing is merely an example, and that other processing could be employed. For example, the issuance of notifications to successful bidders could be eliminated, and after successful bidders had been determined, the final state of the transaction quickly established. Further, instead of waiting for the expiration of the tendering period, each time a bid was accepted the calculation of the optimum solution and the determination of current successful bidders could be performed and the results announced. In this case, when the tendering period expired, successful bidders would be those whose latest bids so qualified them. Further, tenderers could present bids advantageous to themselves, while monitoring the state of the tendering process. Or, another tendering condition, such as announcing the lowest price and the highest price tendered, could be added.

Figure 3:
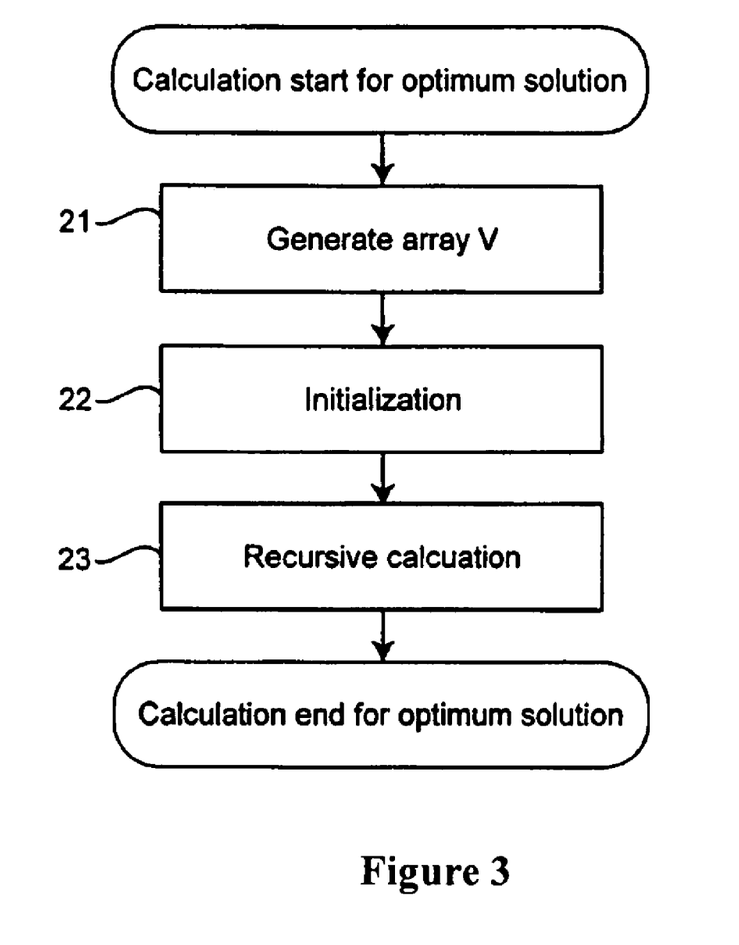
FIG. 3 is a flowchart presenting an overview of the processing for an example optimum solution calculation step.

The process for calculating the optimum solution (step 14) will now be described. FIG. 3 is a flowchart for an overview of an example process for calculating the optimum solution. First, an array V is generated (step 21) and initialized (step 22) wherein evaluation prices are recorded at recursive calculation steps. Then, recursive calculations are performed (step 23).

When generated, the array V has a size that corresponds to the size |B| of the bid set B to be calculated and the number of products in stock s (the number of products available for sale). Specifically, a two-dimensional array (|B|+1)×(s+1) is generated. As will be described later, the maximum evaluation price, obtained when the number of products remaining is indicated by the column index j, is recorded in each element of the array V for the bids from |B| to k.

Figure 4:
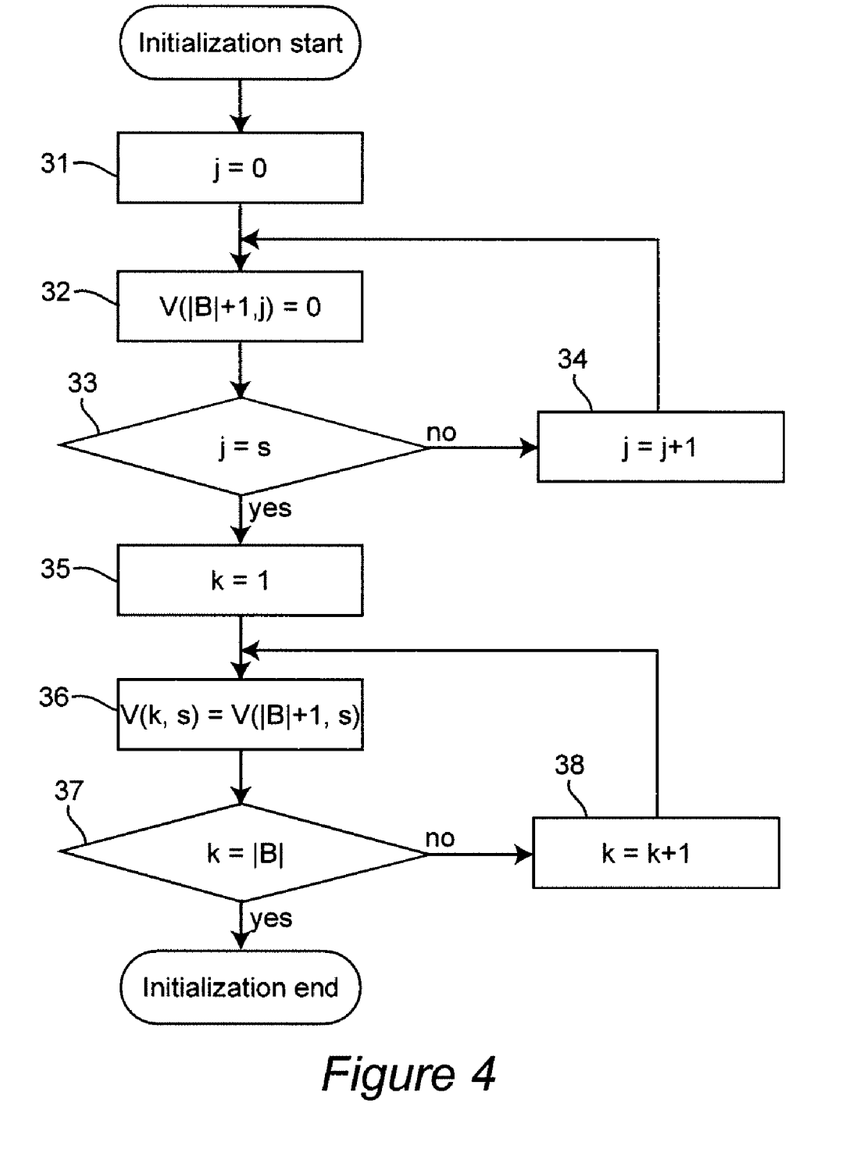
FIG. 4 is a detailed flowchart of the processing performed for an initialization step.

Next, the initialization process (step 22) will be described. FIG. 4 is a detailed flowchart for the initialization process (step 22), and equation 16 represents a pseudo code showing the initialization process.

$V(|B|+1,j):=0$ for all $0 \leq j \leq s$ $V(k,s):=V(|B|+1,s)$ for all $1 \leq k \leq |B|$ [Equation 16]

where |B| denotes the size of a bid set B, and s denotes the number of stocks.

First, 0 is substituted into variable j (step 31), and the initial value of 0 is substituted into $V(|B|+1,j)$ (step 32).

Then, a check is performed to determine whether the variable j is s (step 33). When the decision is false, the variable j is incremented by one (step 34) and program control returns to step 32. That is, the value of each element (0 to s) on the (|B|+1)th row of the array V is initialized to 0. Then, 1 is substituted into a variable k (step 35), and the initial value $V(|B|+1,s)$ is substituted into $V(k, s)$ (step 36). Then, whether the variable k is |B| is determined (step 37). When the decision is false, the variable k is incremented by one (step 38) and the program control returns to step 36. In other words, the value for each element (1 to |B|) of the s-th column of the array V is initialized as $V(|B|+1, s)$.

Figure 5:
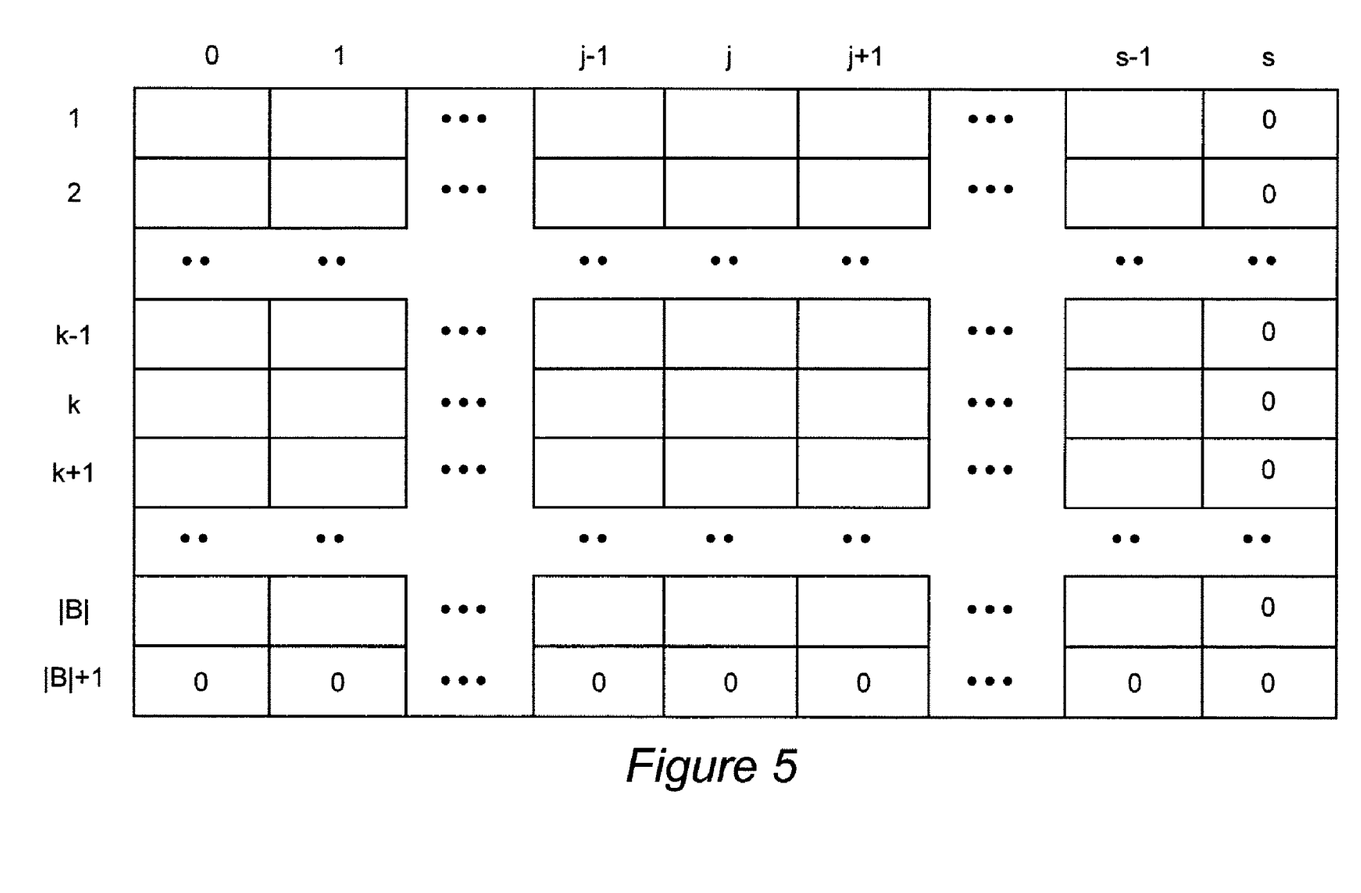
FIG. 5 is a diagram showing the values of elements in an array V when the initialization has been completed.
Figure 6:
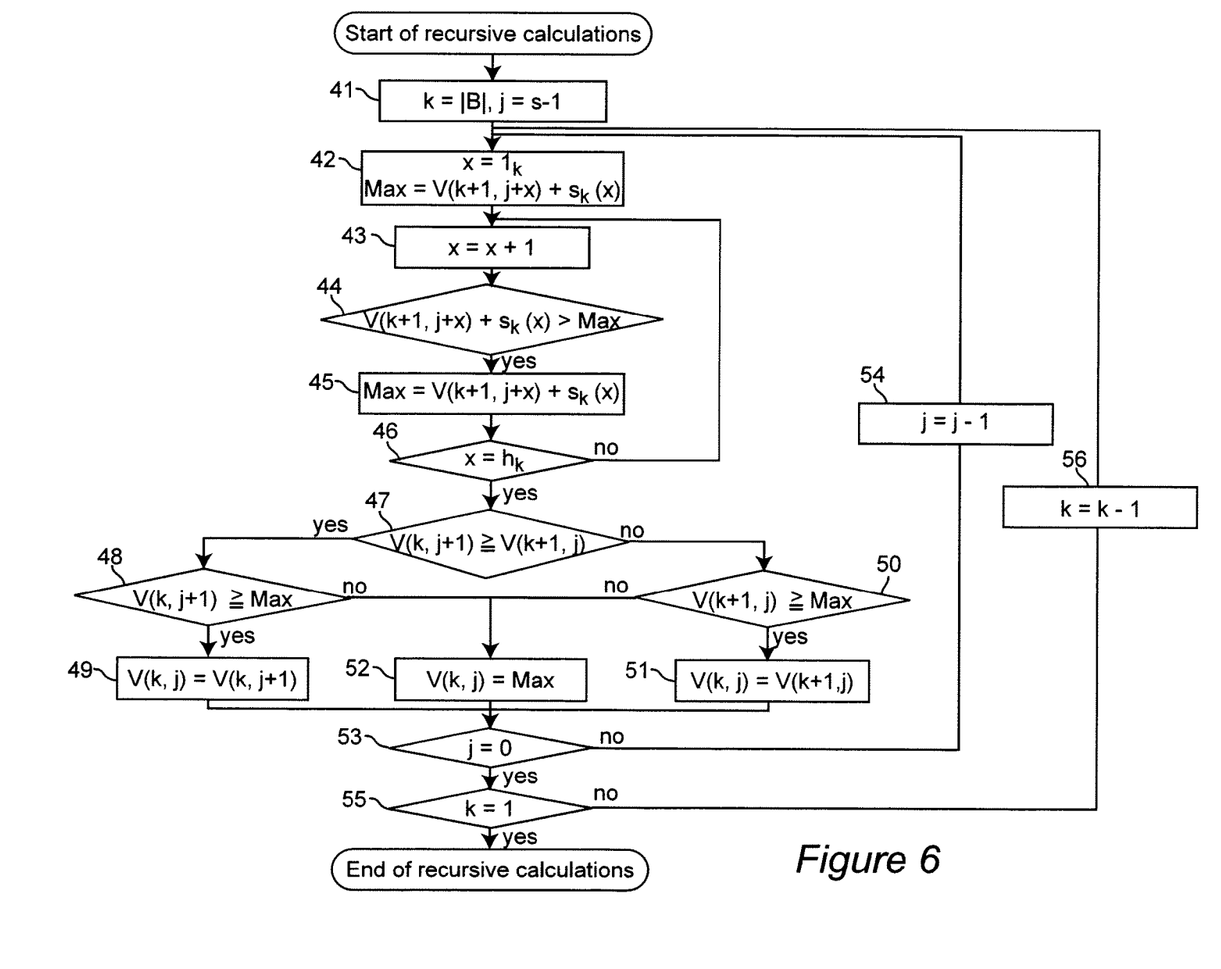
FIG. 6 is a flowchart for an example recursive calculation process.

FIG. 5 is a diagram showing the values of the elements of the array V when the initialization is terminated. In this embodiment, since the value of $V(|B|+1, s)$ is "0", the values in the s-th column are also "0". Thus, the values of all the elements on the (|B|+1)th row and in the s-th column are The recursive calculation process (step 23) will now be described. FIG. 6 is a flowchart showing an example recursive calculation process, and equation 17 represents the recursive calculation step and a pseudo code showing the recursive function used for the recursive calculation.

For $k=|B|$ down to 1 and $j=s-1$ down to 0, $V(k, j):=\max\{V(k+1, j), V(k, j+1), \max_{l_k \leq x \leq h_k}\{V(k+1, j+x)+e_k(x)\}\}$ [Equation 17]

wherein |B| denotes the size of a set B of bids; s denotes the number of stocks; $l_k$ denotes the minimum desired product units included in the bid $b_k$; $h_k$ denotes the maximum desired product units included in the bid $b_k$; and $e_k(x)$ denotes the evaluation price when x product units included in the bid $b_k$ are purchased.

After the initialization process, the initial values of |B| and s−1 are substituted respectively into the variables k and j that serve as pointers (step 41). Then, $l_k$ is substituted as the initial value into the number of products x, and $V(k+1,j+x)+e_k(x)$ is substituted into a variable max (step 42). When j+x exceeds s, the array V does not have such an element. In this case, this need not be taken into account for the calculation. Or, when such a value is to be stored as an element of the array V, −∞ (or a satisfactorily small value) can be substituted.

The value of x is incremented by one, and a check is performed to determine whether $V(k+1,j+x)+e_k(x)$ is greater than the variable max (step 43). When the decision is true, the variable max is replaced with $V(k+1,j+x)+e_k(x)$ (step 45).

When the decision is false, program control advances to step 46 without a replacement being performed.

Next, whether the value of x is $h_k$ is determined (step 46). When the decision is false, program control returns to step 43, whereas when the decision is true, program control advances to step 47.

That is, at steps 42 to 46, $V(k+1,j+x)+e_k(x)$, whose value reaches the maximum within the range wherein x is from $l_k$ to $h_k$, is searched for.

A check is performed to determine whether $V(k,j+1)$ is equal to or greater than $V(k+1,j)$ (step 47). When the decision at step 47 is true, or when $V(k, j+1)$ is greater, a check is further performed to determine whether $V(k,j+1)$ is equal to or greater than max (step 48). When the decision at step 48 is true, the value of $V(k,j+1)$ is substituted into V(k, j) (step 49). When the decision at step 47 is false, or when $V(k+1,j)$ is greater, a check is further performed to determine whether $V(k+1,j)$ is equal to or greater than max (step 50). When the decision at step 50 is true, the value of $V(k+1,j)$ is substituted into $V(k,j)$ (step 51). When the decision at step 48 or 50 is false, the value of max is substituted into $V(k,j)$ (step 52). That is, at steps 47 to 52, the largest value is selected from among $V(k+1,j)$, $V(k,j+1)$ and max, and is recorded in $V(k,j)$. Following this, whether the variable j is 0 is determined (step 53), and when the decision is false, the variable j is decremented by one (step 54). Program control then returns to step 42, and the above process is repeated until the variable j is equal to 0 (step 53). When the variable j is 0, the value is recorded in the individual elements on the k-th row of the array V. When the variable j is 0 and the decision at step 53 is true, whether the variable k is 1 is determined (step 55). When the decision is false, the variable k is decremented by one (step 56), and program control returns to step 42. The above process is repeated until the variable k is equal to 1 (step 55), whereupon all the elements of the array V are recorded and the calculation is thereafter terminated.

As is described above, the values recorded in the individual elements of the array V are the maximum evaluation prices obtained when the number of products indicated by the column index j are left on the rows (bids) from |B| to k. Thus, the maximum gain is recorded in V(1,0).

Figure 7:
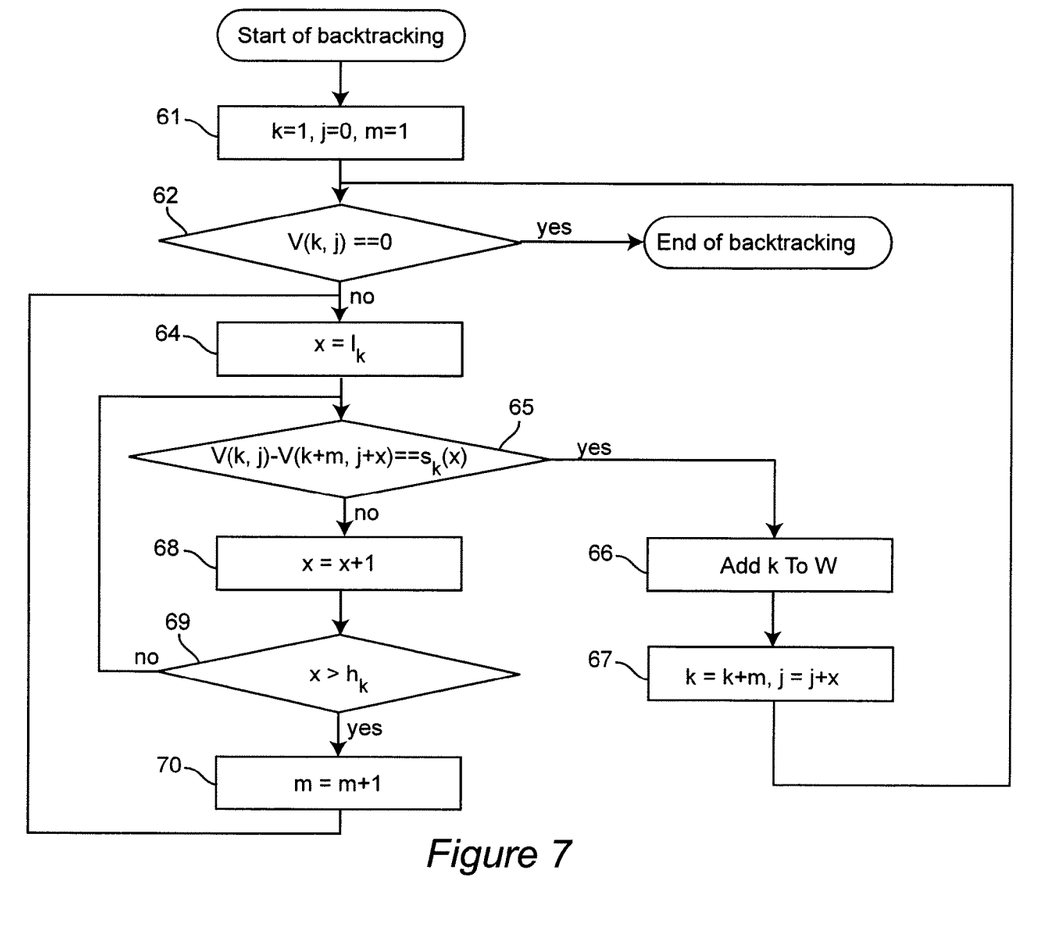
FIG. 7 is a flowchart for an example backtracking process.

The backtrack process (step 15) will now be described. FIG. 7 is a flowchart showing an example backtrack process.

First, initial values of 1, 0 and 1 are respectively substituted into variables k, j and m (step 61), and whether $V(k,j)$ is equal to 0 is determined (step 62). When this decision is true, the backtracking process is terminated (step 63). When the decision at step 62 is false, $l_k$ is substituted into the variable x (step 64), and a check is performed to determine whether $V(k,j)−V(k+m,j+x)$ is equal to $e_k(x)$ (step 65). When the decision at step 65 is true, the k-th bid is selected, and the variable k is added to an array W wherein the number of the bid of a successful bidder is recorded (step 66). Thereafter, the variables k and j are respectively replaced with k+m and j+x (step 67), and program control returns to step 62. When the decision at step 65 is false, the variable x is incremented by one (step 68) and a check is performed to determine whether it exceeds $h_k$ (step 69). When the variable x exceeds $h_k$, i.e., when the decision at step 69 is true, the variable m is incremented by one (step 70) and program control returns to step 64. When the variable x does not exceed $h_k$, i.e., when the decision at step 69 is false, program control returns to step 65. The above process is repeated until the backtracking is completed. That is, during the backtracking, the value of V is traced, beginning at V(1,0), in the direction in which the variables k and j are increased, and is so selected that the sum of the evaluation prices $e_k$ of the bids $b_k$ is equal to the maximum gain V(1,0). The person who submitted the bid $b_k$ (k⊂W) of the selected k is a successful bidder.

A successful bidder is determined in the above described manner. The notification to the successful bidder and the trading performed thereafter have already been described.

According to this embodiment, the maximum and minimum volumes of desired products to be purchased can be designated, and the evaluation price can also be designated as a function for the purchase volume. Since such a bid is permitted, a transaction involving a large amount of materials, such as parts, can be smoothly performed between companies. Further, when the above described algorithm is employed for the calculation of the dynamic programming for determining a successful bidder based on the bids, the required number of calculations is at most $O(|B|\cdot s^2)$. When the maximum value of $h_k - l_k$ is max, the required number of calculations is $O(|B|\cdot s\cdot ma)$, which is a practical number of calculations for current computers. That is, according to the embodiment, an auction method and system can be provided that can permit, by the performance of a practical number of calculations, a bid that is consonant with the transaction conditions.

Second Embodiment

As a special case for a bid that is permitted in the first embodiment, the evaluation price per unit of the product is not changed in accordance with the purchase volume, as in "will purchase 30 to 50 units at 60,000 yen per unit". That is, the function for the evaluation of the value of the product is linear. In this case, in addition to the optimum score (V) under the above described condition, the number of products currently obtained by the bid under this condition is maintained, so that the number of calculations can be reduced. An array Q is newly introduced by recording the number of obtained products.

The auction for the second embodiment can be held using the same system as is used for the first embodiment. The auction method for this embodiment will now be described.

The auction method of this embodiment is performed in the same manner as enumerated by steps 11 to 13 in FIG. 2 for the first embodiment. In this embodiment, the step of calculating the optimum solution is substantially the same as step 14 and FIG. 3 for the first embodiment for the calculation of the optimum solution. It should be noted that at the step whereat the array V is generated, step 21, the array Q is also generated.

Furthermore, in this embodiment, at the initialization step, not only the array V but also the array Q is initialized. Equation 18 represents a pseudo code showing the initialization step for this embodiment.

$V(|B|+1,j):=0$ and $Q(|B|+1,j):=0$ for all $0 \leq j \leq s$ $V(k,s):=V(|B|+1,s)$ and $Q(k,s):=Q(|B|+1,s)$ for all $1 \leq k \leq |B|$ [Equation 18]

The recursive calculations performed for this embodiment are represented in equation 19.

$$V(k, j) := \max \begin{cases} V(k+1, j) \\ V(k, j+1) \\ V(k, j+1) + e_k \\ V(k+1, j+l_k) + e_k l_k \end{cases} \text{(if } l_k \leq Q(k, j+1) < h_k\text{)}$$ [Equation 19]

$$Q(k, j) := \begin{cases} Q(k, j+1) + 1 & \text{(if } V(k, j) = V(k, j+1) + e_k\text{)} \\ l_k & \text{(if } V(k, j) = V(k+1, j+l_k) + e_k l_k\text{)} \\ Q(k, j+1) & \text{(if } V(k, j) = V(k, j+1)\text{)} \\ 0 & \text{(otherwise)} \end{cases}$$

where $e_k$ denotes the evaluation price for bid $b_k$ for one product unit. The other variables are the same as those used in equation 17 for the first embodiment.

As is shown in equation 19, either V(k,j+1) or V(k,j+1)+$e_k$ is selected in accordance with the value of Q(k, j+1), and the largest of the selected values V(k+1,j) and V(k+1,j+1)+$e_k l_k$ is recorded in V(k,j). One of the values in equation 19 is recorded in Q(k,j) in accordance with the value recorded in V(k,j).

As well as the processing in FIG. 6 for the first embodiment, the recursive calculations are repeated from k=|B| to 1 and from j=s−1 to 0. When all the recursive calculations have been completed, the maximum gain is recorded in V(1,0), as in the first embodiment.

Since the backtracking of the embodiment and the following processes (steps 15 to 17) are the same as those in the first embodiment, no further explanation for them will be given.

According to this embodiment, since the evaluation price for one product unit does not depend on the number of products, the number of products currently obtained by a bid can be recorded in the array Q, and the amount of calculations can be reduced compared with the first embodiment. The number of calculations required for this embodiment is $O(s\cdot|B|)$.

Third Embodiment

In the first and second embodiments, one bid is submitted for only one type of product. Thus, even when multiple product types are bid on, this auction system is substantially the same as holding separate auctions for individual product types. However, in actuality, several types of products can be ordered using the same purchase amount. For example, when computers are to be employed, the same number of main bodies and display devices will be purchased. In this embodiment, to satisfy this request, the first and second embodiments are extended so that a bids covering multiple types of products can be presented.

It should be noted that when no restriction is imposed on the combination of products that bids can be submitted for, the problem for obtaining the optimal distribution of products is the NP-hard problem. Therefore, in order to efficiently resolve the problem, a restriction is imposed on the combination of products that can be bid on at one time.

Figure 8:
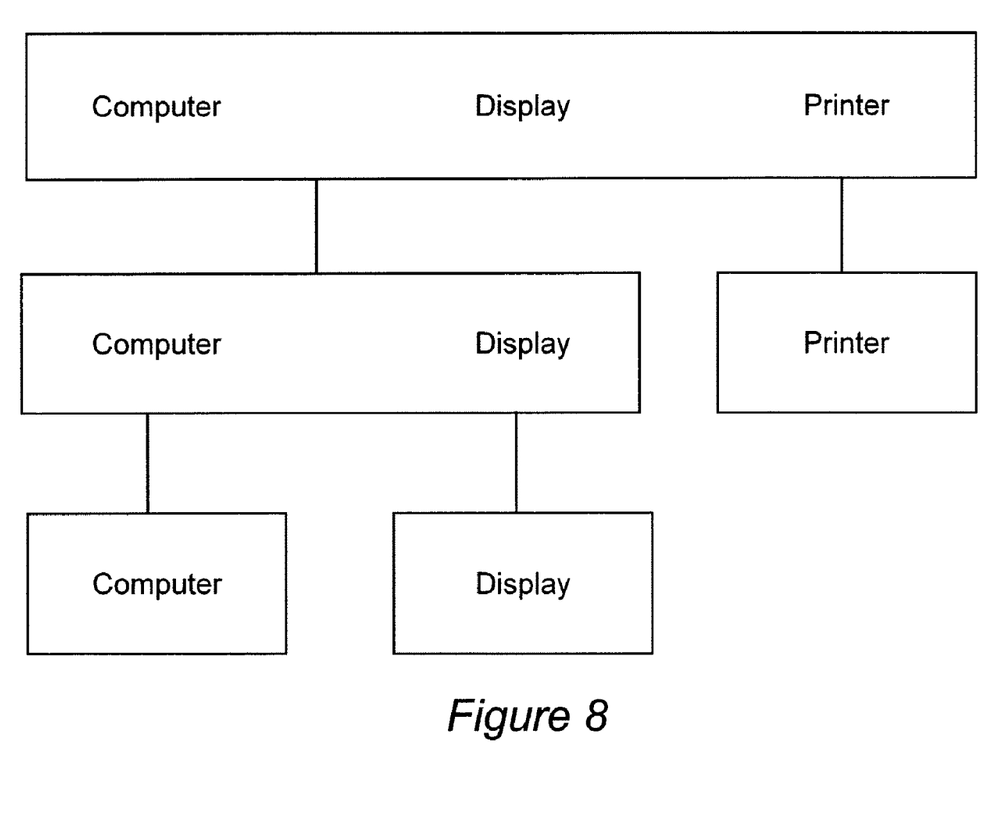
FIG. 8 is a diagram showing the relationships between item sets for which bids can be submitted.

FIG. 8 is a diagram showing the relationship among item sets for which bids are permitted. Bids are permitted for sets of products (items) for trees such as the one shown, or for a forest composed of such trees. That is, for an arbitrary two combinations of products that can be bid for, one combination is a subset of the other, or the two combinations do not have a portion in common. For example, in FIG. 8 the combinations for which bids can be submitted are (computer), (display), (printer), (computer and display) and (computer, display and printer). Example bids for these product sets are bid A: "80 to 100 sets of computers and display devices, 120,000 yen per set"; bid B: "20 to 30 sets of computers, display devices and printers, 230,000 yen per set"; and bid C: "120 to 150 computer units, 70,000 yen per unit".

More specifically, a bid for this embodiment is permitted when a condition $C_i \cap C_j \neq \phi$ or $C_i \subset C_j$ is established for two combinations $C_i$ and $C_j$ (i<j) of products for which bids can be submitted. In FIG. 8, the combinations for which bids are permitted are $C_1$={computer}, $C_2$={display}, $C_3$={printer}, $C_4$={computer, display} and $C_5$={computer, display, printer}.

When the algorithms of the first and second embodiments are hierarchically employed under the above condition established for product sets, an algorithm for the optimal distribution of products can be obtained. The definitions of the symbols used in the following explanations are as follows. Parent($C_i$) is defined as the smallest j that satisfies $C_i \subset C_j$ and $C_i \neq C_j$, and Children($C_j$) is defined as a set of all the js that satisfy i=Parent ($C_j$). $C^R$ is defined as a subset of C, and each element in $C^R$ is defined as a set of elements that are not children of the other elements in C. In other words, $C^R$ is the root of a tree in a forest, and $s_{ck}$ is defined as the minimum stock of each product included in the combination $C_k$, i.e., $s_{Ck}$ satisfies $s_{Ck}=\min_{a \in Ck} s_a$.

An auction held for this embodiment will now be described. The auction system for the embodiment is the same as that for the first embodiment, and the presentation of tendering conditions and the acceptance of bids provided for the auction method of this embodiment are the same as steps 11 and 12 in FIG. 2 for the first embodiment. The generation of bid sets for this embodiment differs from that employed for the first embodiment, and bid sets {$B_{Ci}$} are generated for each product combination $C_i$ for which bids can be submitted.

The calculation of the optimum solution (corresponding to step 14 in FIG. 2) is performed in the following manner. First, an array V is generated in the same manner as in the first embodiment. It should be noted that the array V in this embodiment is a three-dimensional array, which even includes the combination $C_i$ as an element, and has a size of |C|×($\max_i|B_{Ci}|$+1)×($\max_a s_a$+1), wherein |C| denotes the size of a set C({$C_i$, $C_2$, ..., $C_{|C|}$}) of product combinations for which bids can be submitted, $\max_i|B_{Ci}|$ denotes the maximum |$B_{Ci}$|, and $\max_a s_a$ denotes the maximum $s_a$. The array need not always be three-dimensional, and may be two-dimensional for each combination $C_i$.

Then, a check is performed to determine whether Children($C_i$) of the product combination $C_i$ is $\phi$ (empty), and the calculation is performed first for the product combination for which Children($C_i$)=$\phi$ has been established. Equation 20 represents a pseudo code indicating the initialization step when Children($C_i$)=$\phi$ has been established. The initialization step corresponds to the one for the first embodiment.

$$V(C_i,|B_{Ci}|+1,j):=0 \text{ for } 0 \leq j \leq s_{Ci}$$

$$V(C_i,k,s_{Ci}):=V(C_i,|B_{Ci}|+1,s_{Ci}) \text{ for } 1 \leq k \leq |B_{Ci}| \qquad \text{[Equation 20]}$$

Then, recursive calculations are performed for the product combination for which Children($C_i$)=$\phi$ has been established. Equation 17 in the first embodiment or equation 19 in the second embodiment can be employed for the recursive calculations. Specifically, Equation 17 is employed when a bid includes the maximum value and the minimum value for the desired number of products and when the evaluation price for one unit is changed in accordance with the number of units to be purchased, and equation 19 is employed when the evaluation price for one unit is not changed. Further, equation 12 in the prior art can also be employed when no upper and lower limits are established for the desired number of products.

It should be noted that the recursive calculation loop is performed from |$B_{Ci}$| to 1 and from $s_{Ci}$ to 0. This calculation step corresponds to the one in the first embodiment.

Next, the calculations are performed for the product combination for which Children($C_i$)≠$\phi$ has been established.

Equation 21 represents a pseudo code indicating the initialization step when Children($C_i$)≠$\phi$ has been established.

$$V(C_i,|B_{Ci}|+1,j):=\Sigma_{l \in Children}(Ci)V(C_l,1,j) \text{ for } 0 \leq j \leq s_{Ci}$$

$$V(C_i,k,s_{Ci}):=V(C_i,|B_{Ci}|+1,s_{Ci}) \text{ for } 1 \leq k \leq |B_{Ci}| \qquad \text{[Equation 21]}$$

As is shown in equation 21, when a child set is present for $C_i$, as the initial value for this child set, the sum $V(C_i,1,j)$ is substituted into $V(C_i,|B_{Ci}|+1,j)$.

The recursive calculations are performed in the same manner as when Children($C_i$)≠$\phi$ has been established, by using the same equation as is used when Children($C_i$)≠$\phi$ has been established. Further, as well as when Children($C_i$)≠$\phi$ +has been established, the recursive calculation loop is performed from |$B_{Ci}$| to 1 and from $s_{Ci}$ to 0.

When the optimum calculations have been completed, the maximum gain is substituted for the individual trees of the forest ($C^R$ and its children). Thus, the maximum gain for the overall woods is $\Sigma_{Ci \in C}{}^R V(C_i,1,0)$.

Backtracking is performed as in the first embodiment. However, while the forest-shaped hierarchical structure of products is employed for this embodiment, actually it can be assumed that an auction is held for each tree, and backtracking is performed in the following manner for each tree for which $C_i \in C^R$ is a root. The backtracking process is initiated with $V(C_i, 1,0)$, and continues until $V(C_i,|B_{Ci}|+1, k)$ is reached. Then, the backtracking process is branched to each $C_j \in$Children($C_i$) and continued at $V(C_j,1,k)$. Thereafter, the backtracking process is similarly continued until a leaf node is reached. Through this processing, bids can be selected that implement the optimal distribution.

According to the embodiment, the NP-hard problem can be avoided by imposing a predetermined limitation on the product combinations, and only a practical number of calculations is required to select the bids that provide the maximum gain. It should be noted that the number of calculations performed using the algorithm of this embodiment is $O(|B| \cdot \max_k \cdot s_k)$, wherein maxk denotes the maximum number of bids submitted for bid sets selected from among the individual combinations. When the evaluation price for one product unit is changed (non-linear), the number of calculations that is required is $O(|B| \cdot (\max_k \cdot s_k)^2)$.

The present invention has been described by referring to the preferred embodiments; however, the present invention is not limited to these embodiments, and can be variously modified without departing from the scope of the invention.

In the first embodiment, the algorithm that is employed compares $V(k,j+1)$, $V(k+1,j)$ and $V(k+1,j+1)+e_k(x)$ and selects the largest value of the three. However, another algorithm may be employed, such as an algorithm that implements a max function for selecting the largest value from among a group of numbers provided as arguments.

Further, the backtracking method is not limited to that used for each embodiment. For example, at steps 49, 51 and 52 in FIG. 6, the element used to calculate the array $V(k,j)$ can be recorded as an information pointer. That is, an array element that constitutes the origin can be recorded as information pointer $P(k,j)=(a,b)$, and by using this pointer for tracing, a search for the root of the backtracking process can be performed. In this case, the value of x, which was used to calculate the variable max, must be recorded, and the element that is the origin of the variable max when step 52 is performed must be recorded.

For the auction method used in these embodiments the Internet has been employed, but another network may be employed instead. And in addition, bids or sales information may be entered using input devices connected to special lines or to other systems. Further, bids and other information need not be transmitted by information processing means and communication means, and may be transmitted by telephone or may be manually entered into the system of the present invention.

The specific effects obtained by the present invention are as follows. A solution can be provided for the problem involved in determining a successful bidder in an auction wherein bids are submitted for a great number of trading targets (products). Further, an auction method and an auction system can be provided that require only a practical number of calculations for their execution, and that permit bids to be submitted for a combination of products. Furthermore, an auction method and an auction system can be provided that require only a practical number of calculations for their execution, and that permit a bid having a range for a desired volume of products. In addition, an auction method and an auction system can be provided that require only a practical number of calculations for their execution, and that can change an evaluation price in accordance with the product volume.

The invention claimed is:

1. A computer-implemented auction method for holding an auction for a product comprising the steps of:

receiving bids from at least one computer or from multiple computers within a network of computers that include minimum desired volumes and maximum desired volumes and evaluation prices for said product wherein said evaluation prices are represented as a non-linear function relative to the desired volume of said product in said transaction;

generating, using computing resources, a finite set of bids that include as an element said bids that were received from said at least one computer or from multiple computers within said network of computers;

employing dynamic programming using said computing resources to generate, using said bids that were received in said receiving bids step, a subset of bids wherein a maximum gain is obtained within a range represented by a count of said product available for sale, wherein said dynamic programming includes (i) allocating a two-dimensional array V, representing a maximum gain, to a memory area by using said dynamic programming using said computing resources;

(ii) initializing said two-dimensional array V; and (iii) recursively solving the recursive equation for said two-dimensional array V, wherein $V(k,j) := \max\{V(k+1,j), V(k,j+1), \max_{l_k \le n \le h_k}\{V(k+1,j+x)+e_k(x)\}\}$ is used as the recursive equation. where $V(k,j)$ denotes said two-dimensional array V populated with said evaluation prices; where k represents the bid number and denotes an integer equal to or greater than 1 and equal to or smaller than n; j represents the number of the product and denotes an integer equal to or greater than 0 and equal to or smaller than s; n denotes the number of bids; s denotes the number of products available for the transaction; $e_k$ denotes the evaluation price when x units of products are purchased according to the bid $b_k$; $l_k$ denotes the minimum volume of the bid $b_k$; and $h_k$ denotes the maximum volume of the bid $b_k$; and identifying or accepting a bid from said subset of bids, wherein a bid is selected by back tracking of said two-dimensional array V from the element on the smallest row and in the smallest column.

2. A computer implemented auction method for holding an auction for a product comprising the steps of:

receiving bids from at least one computer or from multiple computers within a network of computers that include minimum desired volumes and maximum desired volumes and evaluation prices for said product wherein said evaluation prices are represented as a non-linear function relative to the desired volume of said product in said transaction;

generating, using computing resources, a finite set of bids that include as an element said bids that were received from said at least one computer or from multiple computers within said network of computers;

employing dynamic programming using said computing resources to generate, using said bids that were received in said receiving bids step, a subset of bids wherein a maximum gain is obtained within a range represented by a count of said product available for sale, wherein said dynamic programming includes (i) allocating two-dimensional arrays V, representing a maximum gain, and Q, representing a count of a product available, to a memory area by using said dynamic programming;

(ii) initializing said two-dimensional arrays V and Q; and (iii) recursively solving recursive equations for said two-dimensional arrays V and Q using said computing resources, wherein $$V(k, j) := \max \begin{cases} V(k+1, j) \\ V(k, j+1) \\ V(k, j+1) + e_k \\ V(k+1, j+l_k) + e_k l_k \end{cases} \quad (\text{if } l_k \le Q(k, j+1) < h_k)$$

-continued $$Q(k, j) := \begin{cases} Q(k, j+1)+1 & (\text{if } V(k, j) = V(k, j+1) + e_k) \\ l_k & (\text{if } V(k, j) = V(k+1, j+l_k) + e_k l_k) \\ Q(k, j+1) & (\text{if } V(k, j) = V(k, j+1)) \\ 0 & (\text{otherwise}) \end{cases}$$

is employed as said recursive equation, where V(k,j) denotes said two-dimensional array V populated with said evaluation prices; where Q (k,j) denotes said two-dimensional array Q populated with said count of said product available for sale; where k represents a bid number and denotes an integer equal to or greater than 1 and equal to or smaller than n; j represents the number of the product and denotes an integer equal to or greater than 0 and equal to or smaller than s; n denotes the number of bids; s denotes the number of products available for the transaction; $e_k$ denotes the evaluation price when x units of products are purchased according to the bid $b_k$; $1_k$ denotes the minimum volume of the bid $b_k$; and $h_k$ denotes the maximum volume of the bid $b_k$, wherein a bid is selected by back tracking of said two-dimensional array V from the element on the smallest row and in the smallest column.

3. An auction system of computing resources for holding an auction for a product comprising:
   means for receiving bids from at least one computer or from multiple computers within a network of computers that include minimum desired volumes and maximum desired volumes and evaluation prices for said product;
   means for generating, using computing resources, a finite set of bids that include as an element said bids that were received from said at least one computer or from multiple computers within said network of computers;
   means for employing dynamic programming using said computing resources to generate, using said bids that were received from said at least one computer or from multiple computers within said network of computers, a subset of bids wherein a maximum gain is obtained within a range represented by a count of said product available for sale, wherein said means for employing dynamic programming
   (i) allocates a two-dimensional array V, representing a maximum gain, to a memory area by using said dynamic programming using said computing resources;
   (ii) initializes said two-dimensional array V; and
   (iii) recursively solves the recursive equation for said two-dimensional array V, wherein $V(k,j):=\max\{V(k+1,j),V(k,j+1), \max_{lk \leq n \leq hk}\{V(k+1,j+x)+e_k(x)\}\}$ is used as the recursive equation, where V(k,j) denotes said two-dimensional array V populated with said evaluation prices; where k represents the bid number and denotes an integer equal to or greater than 1 and equal to or smaller than n; j represents the number of the product and denotes an integer equal to or greater than 0 and equal to or smaller than s; n denotes the number of bids; s denotes the number of products available for the transaction; $e_k$ denotes the evaluation price when x units of products are purchased according to the bid $b_k$; $1_k$ denotes the minimum volume of the bid $b_k$; and $h_k$ denotes the maximum volume of the bid $b_k$; and
   means for identifying or accepting a bid from said subset of bids, wherein a bid is selected by back tracking of said two-dimensional array V from the element on the smallest row and in the smallest colunm.

4. An auction system of computing resources for holding an auction for a product comprising:
   means for receiving bids from at least one computer or from multiple computers within a network of computers that include minimum desired volumes and maximum desired volumes and evaluation prices for said product;
   means for generating, using computing resources, a finite set of bids that include as an element said bids that were received from said at least one computer or from multiple computers within said network of computers;
   means for employing dynamic programming using said computing resources to generate, using said bids that were received from said at least one computer or from multiple computers within said network of computers, a subset of bids wherein a maximum gain is obtained within a range represented by a count of said product available for sale, wherein said means for employing dynamic programming
   (i) allocates two-dimensional arrays V, representing a maximum gain, and Q, representing a count of a product available, to a memory area by using said dynamic programming using said computer resources;
   (ii) initializes said two-dimensional arrays V and Q; and
   (iii) recursively solves recursive equations for said two-dimensional arrays V and Q using said computing resources,
   wherein $$V(k, j) := \max \begin{cases} V(k+1, j) \\ V(k, j+1) \\ V(k, j+1) + e_k \\ V(k+1, j+l_k) + e_k l_k \end{cases} (\text{if } l_k \leq Q(k, j+1) < h_k)$$

$$Q(k, j) := \begin{cases} Q(k, j+1)+1 & (\text{if } V(k, j) = V(k, j+1) + e_k) \\ l_k & (\text{if } V(k, j) = V(k+1, j+l_k) + e_k l_k) \\ Q(k, j+1) & (\text{if } V(k, j) = V(k, j+1)) \\ 0 & (\text{otherwise}) \end{cases}$$

is employed as said recursive equation, where V(k,j) denotes said two-dimensional array V populated with said evaluation prices; where Q (k,j) denotes said two-dimensional array Q populated with said count of said product available for sale; where k represents a bid number and denotes an integer equal to or greater than 1 and equal to or smaller than n; j represents the number of the product and denotes an integer equal to or greater than 0 and equal to or smaller than s; n denotes the number of bids; s denotes the number of products available for the transaction; $e_k$ denotes the evaluation price when x units of products are purchased according to the bid $b_k$; $1_k$ denotes the minimum volume of the bid $b_k$; and $h_k$ denotes the maximum volume of the bid $b_k$, wherein a bid is selected by back tracking of said two-dimensional array V from the element on the smallest row and in the smallest column.

5. A computer-readable storage medium on which a program for holding an auction for a product is stored, said program enabling computing resources to perform:
   a process for receiving bids from at least one computer or from multiple computers within a network of computers that include minimum desired volumes and maximum desired volumes and evaluation prices for said product wherein said evaluation prices for said product are represented as a non-linear function relative to the desired volume of said product;
   a process for generating, using computing resources, a finite set of bids that include as an element said bids that were received from said at least one computer or from multiple computers within said network of computers;

a process for employing dynamic programming using said computing resources to generate, using said bid set that were received while using said process for receiving bids, a subset of bids wherein a maximum gain is obtained within a range represented by a count of said product available for sale, wherein said dynamic programming includes (i) allocating a two-dimensional array V, representing a maximum gain, to a memory area by using said dynamic programming using said computing resources;

(ii) initializing said two-dimensional array V; and (iii) recursively solving the recursive equation for said two-dimensional array V, wherein $$V(k,j):=\max\{V(k+1,j), V(k,j+1), \max_{1k \leq n \leq hk}\{V(k+1,j+x)+e_k(x)\}\}$$

is used as the recursive equation, where $V(k,j)$ denotes said two-dimensional array V populated with said evaluation prices; where k represents the bid number and denotes an integer equal to or greater than 1 and equal to or smaller than n; j represents the number of the product and denotes an integer equal to or greater than 0 and equal to or smaller than s: n denotes the number of bids; s denotes the number of products available for the transaction; $e_k$ denotes the evaluation price when x units of products are purchased according to the bid $b_k$; $1_k$ denotes the minimum volume of the bid $b_k$; and $h_k$ denotes the maximum volume of the bid $b_k$; and a process for identifying or accepting a bid from said subset of bids, wherein a bid is selected by back tracking of said two-dimensional array V from the element on the smallest row and in the smallest column.

* * * * *